(12) United States Patent
Guaraldo

(10) Patent No.: US 12,123,678 B2
(45) Date of Patent: Oct. 22, 2024

(54) PROJECTILE LAUNCHER

(71) Applicant: ARESIA-Valenton, Valenton (FR)

(72) Inventor: Denis Guaraldo, Valenton (FR)

(73) Assignee: ARESIA-Valenton, Valenton (FR)

( * ) Notice: Subject to any disclaimer, the term of this patent is extended or adjusted under 35 U.S.C. 154(b) by 65 days.

(21) Appl. No.: 18/019,410

(22) PCT Filed: Aug. 2, 2021

(86) PCT No.: PCT/FR2021/051435
§ 371 (c)(1),
(2) Date: Feb. 2, 2023

(87) PCT Pub. No.: WO2022/029383
PCT Pub. Date: Feb. 10, 2022

(65) Prior Publication Data
US 2023/0288169 A1 Sep. 14, 2023

(30) Foreign Application Priority Data

Aug. 6, 2020 (FR) ........................................ 2008315

(51) Int. Cl.
F41B 11/73 (2013.01)
(52) U.S. Cl.
CPC .................... F41B 11/73 (2013.01)
(58) Field of Classification Search
CPC .......... B64D 1/02; B64D 1/04; B63B 22/003; F16B 21/16; F41A 9/21; F41F 5/00; F41F 3/077; F41F 3/08; F41B 11/73
See application file for complete search history.

(56) References Cited

U.S. PATENT DOCUMENTS

| | | | | |
|---|---|---|---|---|
| 1,721,883 A * | 7/1929 | Marsh | ...................... | B64D 1/02 89/1.51 |
| 2,587,690 A * | 3/1952 | Brereton | ................... | F41A 9/50 89/46 |
| 2,723,093 A * | 11/1955 | Price | ......................... | F41F 3/06 89/1.51 |
| 2,912,901 A * | 11/1959 | Kroeger | .................. | F42B 3/006 89/1.51 |

(Continued)

FOREIGN PATENT DOCUMENTS

| | | |
|---|---|---|
| FR | 2479135 A1 | 10/1981 |
| FR | 2497766 A1 | 7/1982 |
| RU | 2343391 C2 | 1/2009 |

Primary Examiner — Michael D David
(74) Attorney, Agent, or Firm — Volpe Koenig

(57) ABSTRACT

A projectile launcher includes: a storage and launching tube suitable for receiving a projectile; a breech sealing one end of the tube; a thruster arranged in the tube between the breech and the projectile, comprising a pressurized gas reserve and suitable for applying an ejection force to a projectile; a plug blocking the other end of the tube, having a locked configuration, in which the plug engages the internal wall of the tube so as to close the tube and to keep the projectile in the tube, and an unlocked configuration, in which the plug is free relative to the tube; and a trigger having a retracted resting configuration and a deployed configuration, suitable for triggering, causing the plug to pass from the locked configuration to the unlocked configuration; wherein the trigger is pneumatic and is supplied with pressure by the reserve.

10 Claims, 2 Drawing Sheets

(56) References Cited

U.S. PATENT DOCUMENTS

| | | | | |
|---|---|---|---|---|
| 2,935,911 A * | 11/1960 | Kroeger | | F42B 3/006 |
| | | | | 89/1.51 |
| 2,971,731 A * | 2/1961 | Graw | | B64D 1/02 |
| | | | | 116/DIG. 40 |
| 3,808,941 A * | 5/1974 | Biggs | | F41F 3/052 |
| | | | | 89/1.51 |
| 4,164,887 A * | 8/1979 | Ouellette | | F41F 5/00 |
| | | | | 89/1.51 |
| 4,263,835 A * | 4/1981 | Dragonuk | | F41B 11/00 |
| | | | | 89/1.51 |
| 4,313,363 A * | 2/1982 | Schreckenberg | | F41A 9/21 |
| | | | | 89/46 |
| 4,397,433 A | 8/1983 | Guitaut et al. | | |
| 4,860,971 A * | 8/1989 | Allen | | B64G 1/52 |
| | | | | 102/262 |
| 4,962,798 A * | 10/1990 | Ferraro | | B64D 1/02 |
| | | | | 89/1.51 |
| 4,974,796 A * | 12/1990 | Carr | | B63B 22/003 |
| | | | | 244/137.1 |
| 5,052,270 A * | 10/1991 | Travor | | B63B 22/003 |
| | | | | 89/1.51 |
| 5,054,364 A * | 10/1991 | Dragonuk | | B63B 22/003 |
| | | | | 89/1.51 |
| 5,063,823 A * | 11/1991 | Marshall | | B63B 22/003 |
| | | | | 89/1.51 |
| 5,076,134 A * | 12/1991 | Marshall | | B64D 1/04 |
| | | | | 89/1.51 |
| H1025 H * | 3/1992 | Dragonu | | 89/1.51 |
| 5,160,101 A * | 11/1992 | Ferraro | | B64D 1/02 |
| | | | | 211/163 |
| 5,198,609 A * | 3/1993 | Gillman | | B64D 1/16 |
| | | | | 89/1.51 |
| 5,359,917 A * | 11/1994 | Travor | | B64B 1/02 |
| | | | | 89/1.51 |
| 6,119,984 A * | 9/2000 | Devine | | B64G 1/222 |
| | | | | 244/172.9 |
| 6,311,930 B1 * | 11/2001 | Hersh | | B64G 1/222 |
| | | | | 294/82.26 |
| 6,539,833 B1 * | 4/2003 | Zatterqvist | | F41F 5/00 |
| | | | | 89/1.51 |
| 7,373,886 B2 * | 5/2008 | Zatterqvist | | B64D 7/08 |
| | | | | 102/342 |
| 7,641,148 B2 * | 1/2010 | Zagni | | B64D 1/10 |
| | | | | 244/137.4 |
| 2015/0175278 A1 * | 6/2015 | Hunter | | B64G 5/00 |
| | | | | 244/158.5 |

\* cited by examiner

[Fig. 1]
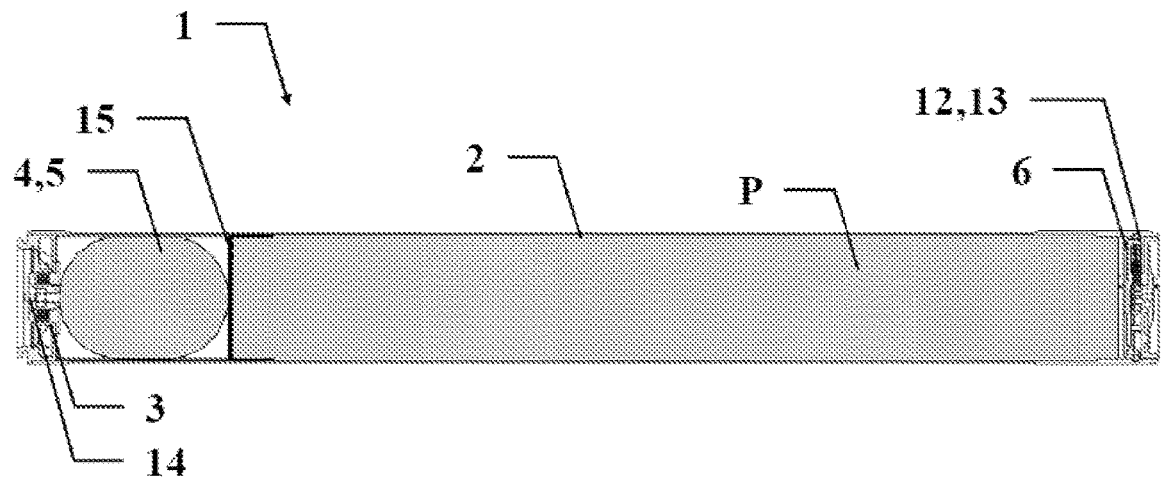
[Fig. 2]
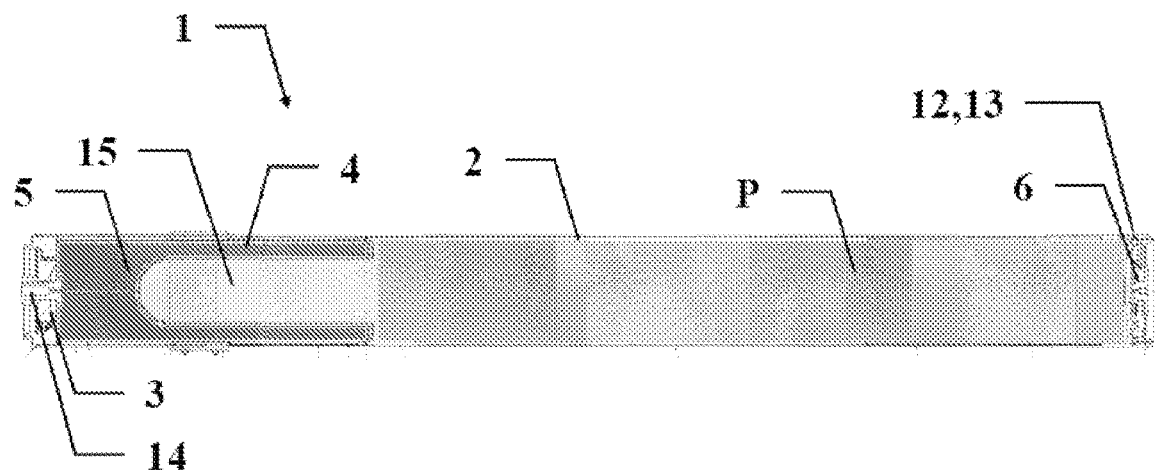
[Fig. 3]
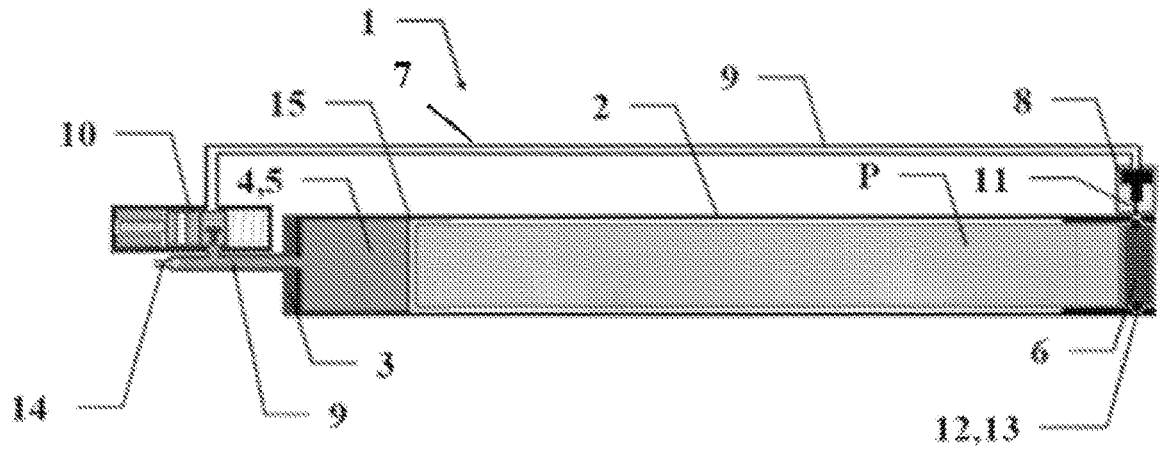

[Fig. 4]
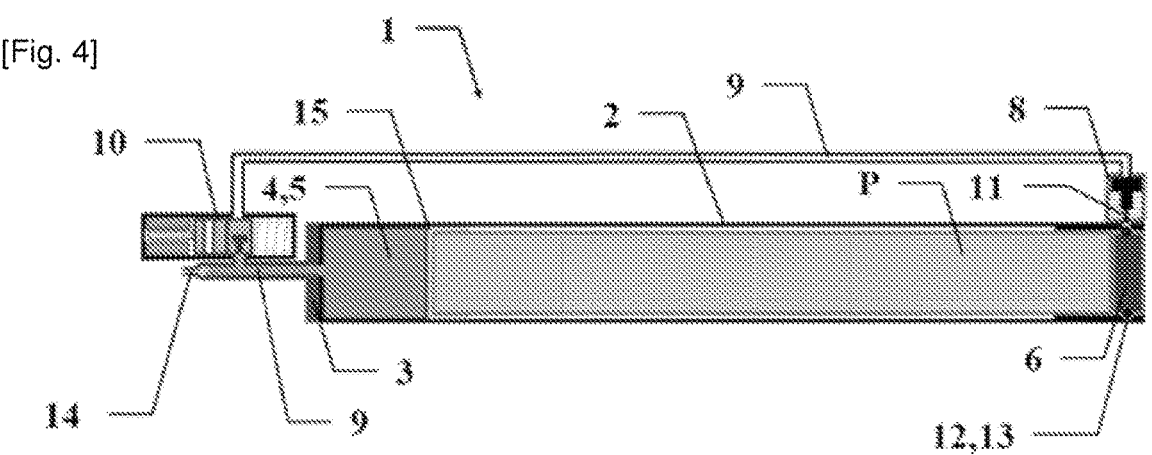
[Fig. 5]
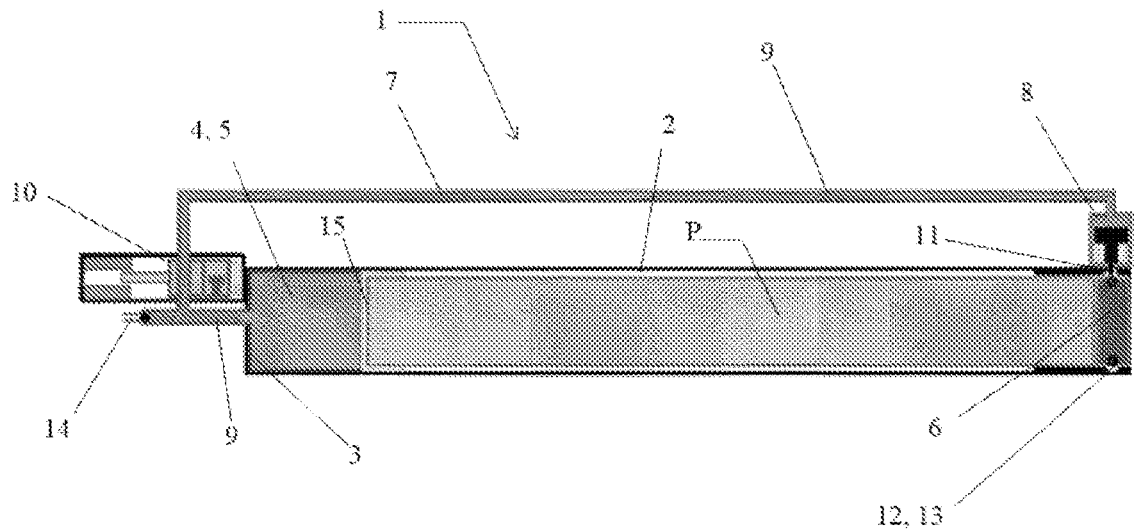
[Fig. 6]
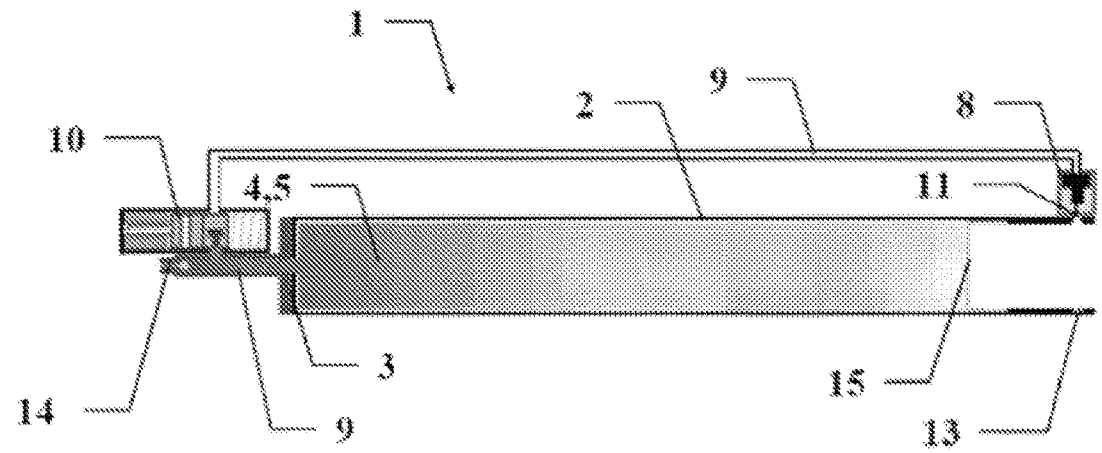

PROJECTILE LAUNCHER

INVENTIVE FIELD

The invention relates to the field of airborne maritime surveillance for which certain missions require the drop of sonar buoys from an aircraft: plane, helicopter, drone, etc. A launcher can be arranged in the cargo hold or outside the aircraft. Such missions may require the drop of many sonar buoys. Therefore, launchers can be grouped in structures.

BACKGROUND

To control the ejection of the buoys, several drop concepts are considered:
- by gravity from a vertical launcher
- by pyrotechnic ejection from a horizontal or vertical launcher
- by pneumatic ejection from a horizontal or vertical launcher FR 2 479 135 Alkan describes a barrel buoy launcher capable of launching short or long buoys by gravity ejection. Four actuators are implemented for triggering and ejection.

FR 2 497 766 Alkan describes a pneumatic piston buoy launcher. Ejection causes a frangible part to break.

Multi-launcher structures may be integrated into the aircraft's cargo hold or outside. If the launchers are installed outside, the structure takes the form of a pod. In the case of a pod-shaped structure, the design of the launchers imposes more demanding restrictions in terms of mass and size, while also requiring a high power.

The Applicant is also aware of an electric trigger which, when controlled by an electric current, is suitable for actuating a detent. The electric trigger is bulky and heavy. Its power is fixed.

Such a solution has the drawback of using a heavy and cumbersome component, the electric actuator. In addition, the electric actuator is located in line with a plug. This is detrimental when it is desired to group several launchers side by side. In addition, this component is of fixed power. Indeed, it is currently desired to increase the range of triggering power. This leads to an increase in the volume and weight of the electric actuator, which is undesirable in the aeronautical field.

SUMMARY

The invention improves the situation.

For this, the invention relates to a launcher for a projectile, such as a sonar buoy, comprising a storage and launching tube suitable for receiving a projectile, a bolt sealing one end of the tube, a thruster arranged in the tube between the bolt and the projectile, comprising a pressurized gas reserve and suitable for applying an ejection force to the projectile, and a plug closing the other end of the tube, having a locked configuration in which the plug engages the internal wall of the tube so as to close the tube and hold the projectile in the tube, and an unlocked configuration in which the plug is free relative to the tube, and a trigger having a retracted resting configuration, and a deployed configuration, suitable for triggering, causing the plug to pass from the locked configuration to the unlocked configuration, where the trigger is pneumatic and is supplied with pressure by the reserve.

The pneumatic power available to the trigger is proportional to the ejection power, by equality of pressure, the energy source being the same.

In one embodiment, the trigger comprises an actuator, a pipe connecting the reserve to the actuator and at least one dispenser arranged on the pipe.

In one embodiment, said at least one dispenser comprises at least two dispensers arranged in series. Preferably, the dispensers are angularly offset.

In one embodiment, a dispenser comprises an inlet, an outlet, a closed configuration where the inlet and the outlet are closed and an open configuration where the inlet and the outlet are connected to each other. The dispenser is single acting: returned to the closed configuration by a spring and controlled in the open configuration by a control, preferably electrical, which may be coupled with a manual control.

In one embodiment, said at least one dispenser is arranged in the vicinity of the reserve, preferably as an extension of the tube beyond the bolt.

In one embodiment, the actuator is single acting, returned to a retracted configuration by a spring and controlled in a deployed configuration, suitable for triggering, by a pneumatic control, which may be coupled with a manual control.

In one embodiment, the actuator is arranged in the vicinity of the plug.

In one embodiment, the actuator comprises a rod, dimensioned to, including in the deployed configuration, remain outside the inner volume of the tube. Interference with the ejection of the plug or projectile is avoided.

In one embodiment, the trigger comprises a calibrated leak, for example of very small cross-section, in order to allow the trigger to return to its resting configuration. The risk of an untimely triggering in case of a dispenser leak is reduced.

In one embodiment, the calibrated leak is provided in the sealing of the actuator.

BRIEF DESCRIPTION OF THE DRAWINGS

The invention will be better understood upon reading the following description, made only by way of example, and with reference to the appended figures in which:

FIG. 1 shows, in a side view cut along the longitudinal axis, a launcher according to one embodiment, FIG. 2 shows, in a side view cut along the longitudinal axis, a launcher according to another embodiment, FIG. 3 shows, in a side view cut along the longitudinal axis, a launcher according to another embodiment, with its trigger, ready to launch, FIG. 4 shows, in a side view cut along the longitudinal axis, the launcher of FIG. 3, at the beginning of the launch, FIG. 5 shows, in a side view cut along the longitudinal axis, the launcher of FIG. 3, during launch, FIG. 6 shows, in a side view cut along the longitudinal axis, the launcher of FIG. 3, at the end of the launch.

DETAILED DESCRIPTION OF THE PREFERRED EMBODIMENTS

With reference to FIGS. 1 and 2, to make a launcher 1 for a projectile, such as a sonar buoy, a storage and launching tube 2 is used. The tube 2 is closed at one end by a bolt 3 attached to the tube 2 and at the other end by a removable plug 6. Between the two ends, the tube 2 can receive a projectile P, with a cross-section substantially identical to the cross-section of the tube 2 with a clearance ensuring free sliding of the projectile P relative to the tube 2. The projectile P can be a cylindrical buoy, especially with a standard 130 mm diameter and 914 mm length.

A pneumatic ejection system or projectile launcher maintains the pressure in the closed volume during all phases of transport and, at the desired moment, releases and transmits the energy to a load. These operations have to be performed with a level of reliability that meets aeronautical safety requirements. Pneumatic ejection systems are robust enough to take account of the environments encountered in all phases of use: storage, taxiing, flight, severe landing, etc.

For the grouping of launchers in a pod, the Applicant has developed a buoy launcher capable of horizontal operation. Increasing the pneumatic pressure to compensate for the loss of the accelerating effect of gravity in the case of vertical ejection involves redesigning the trigger because increasing the pneumatic pressure increases the force required to unlock the retractable ring.

The launcher 1 also comprises a thruster 4 arranged in the tube 2 between the bolt 3 and the projectile P. The thruster 4 is suitable for applying an ejection force to the projectile P, mainly axial along the axis of the tube 2. The thruster 4 is pneumatic and comprises a pressurized gas reserve 5 to produce the ejection force.

FIG. 1 illustrates a thruster 4 according to a first embodiment, comprising a gas reserve 5 in the form of a flexible and deformable bladder suitable for receiving a pressurized gas, typically air. Arming the thruster 4 is made by pressurizing the bladder, via a valve 14. This creates a force, channeled mainly longitudinally, that is, along the axis of the tube 2, which tends to push the projectile P against the plug 6. The bladder, on deploying, pushes the projectile P directly. A separator/plunger 15 can be interposed between the thruster 4 and the projectile P.

FIG. 2 illustrates a thruster 4 according to a second embodiment, comprising a gas reserve 5 and a rigid plunger 15. At least the part of the reserve 5 in contact with the plunger 15 is flexible and deformable. Arming the thruster 4 is made by pressurizing the reserve 5, via a valve 14. This creates a force, channeled mainly longitudinally, that is, along the axis of the tube 2, which tends to push the projectile P against the plug 6. The reserve 5, on deploying, unrolls and pushes the plunger 15 which in turn pushes the projectile P.

The plug 6 has a locked configuration in which the plug 6 engages the internal wall of the tube 2. Thus, the plug 6 is firmly secured to the tube 2. The plug 6 thus closes the tube 2 and holds the projectile P in place in the tube 2, including when the thruster 4 is armed and applies an ejection force. The plug 6 further has an unlocked configuration in which the plug 6 is free relative to the tube 2, and can thus be removed and separated from the tube 1.

The launcher 1 further comprises a trigger 7. The trigger 7 has a retracted resting configuration, in which the trigger 7 is by default and most of the time. The trigger 7 also has a deployed configuration. In the deployed configuration, the trigger 7 is suitable for actuating the plug 6, and triggering, causing the plug 6 to pass from the locked configuration to the unlocked configuration.

Therefore, a sequence of use of such a launcher 1 typically comprises the following steps. While the thruster 4 is disarmed, a projectile P is introduced into the tube 2. The projectile P is immobilized inside by placing the plug 6 at the end of the tube 2. The plug 6 is secured to the tube 2 in a locked configuration. The thruster 4 can then be armed, typically by increasing the pressure in the gas reserve 5, especially by compression/inflation by means of the valve 14. The engagement of the plug 6 with the tube 2 is achieved in a radial direction and thus effectively opposes the substantially axial force exerted by the thruster 4 on the projectile P and transferred by the projectile P to the plug 6. The launcher 1, thus loaded and armed, is suitable for being transported, loaded on aircraft, and remains loaded and armed until the projectile P is ejected. When it is desired to eject the projectile P, a control is transmitted to the trigger 7. The trigger 7 then triggers and passes from the folded to the unfolded configuration. In doing so, the trigger 7 actuates the plug 6 which passes from the locked configuration to the unlocked configuration. The plug 6 is then released and can be detached from the tube 2. The armed thruster 4 continues to exert an ejection force. The thruster 4 therefore pushes on the projectile P. The projectile P itself pushes on the plug 6. The projectile P, under the effect of the ejection force, is ejected outside the tube 2, pushing the plug 6 in front of it.

The operation of the plug 6 will now be described. A locking mechanism, integral with a plug 6, can pass from a locked configuration to an unlocked configuration.

The locking mechanism comprises a ring 12, which is for example circular. The ring 12 has a cross-section complementary to the cross-section of a groove 13 made in the internal wall of the tube 2. The ring 12 is elastic. At rest, the ring 12 has an outer diameter which is strictly smaller than the inner diameter of the tube 2. Therefore, at rest, the ring 12 remains outside the groove 13 and the ring 12/locking mechanism/plug 6 assembly is in an unlocked configuration. The plug 6 can then move freely relative to the tube 2, to be extracted therefrom or on the contrary to be introduced thereinto.

The locking mechanism further comprises a toggle device. The toggle device has two stable configurations: a disarmed configuration and an armed configuration. The toggle device comprises two hinge points. A spring improves the stability of both configurations. When armed, the toggle device spreads the two hinge points with the ring 12, opposes the elasticity of the ring 12 and increases the diameter of the ring 12. Therefore, the ring 12, thus constrained, has an outer diameter greater than the inner diameter of the tube 2 and smaller than the diameter of the bottom of the groove 13. Also, the ring 12 engages the groove 13 and the ring 12/locking mechanism/plug 6 assembly is in a locked configuration. If the plug 6 is in place in the tube 2 facing the groove 13, the ring 12 engages the groove 13 and the plug 6 is inhibited from moving axially relative to the tube 2.

The locking mechanism further comprises a detent, which is prominent when the toggle device is armed. When the detent is pressed, the toggle device is triggered and passes into the disarmed configuration. The toggle 12, released from its constraint, assists the triggering by its elasticity and returns to the resting configuration and to a smaller nominal diameter. This is done with a retraction of the detent inside the diameter of the ring 12. The plug 6 is unlocked and can be ejected with the projectile P. The plug 6 is non-captive.

To carry out a new ejection, the thruster 4 is disarmed, replaced in its initial volume. The previous sequence can be repeated, starting with the introduction of a new projectile P into the tube 2.

To trigger an ejection of a projectile P, the detent is actuated by means of a trigger.

The launcher 1 illustrated in FIG. 3 is in the armed configuration, ready to launch. The tube 2 is closed at one end by a bolt 3. The projectile P is in place in the tube 2. The plug 6 is in place at the other end. The plug 6 is in a locked configuration, with the ring 12 engaging the groove 13 of the tube 2, preventing the projectile P from exiting. The thruster 4 is arranged between the bolt 3 and the projectile P. The thruster 4 is armed by pressurizing its gas reserve 5.

The launcher 1 also comprises a trigger 7. The trigger 7 is in a retracted or resting configuration. The trigger 7 has another deployed configuration in which the trigger 7 performs a triggering action causing the plug 6 to pass from the locked configuration to the unlocked configuration, initiating a launch phase during which the projectile P is ejected.

The trigger 7 according to the invention is pneumatic. The trigger 7 is supplied with energy by the pressure from the gas reserve 5 of the thruster 4.

This is particularly advantageous in that the principle is scalable in size. An increase in launch power requires a plug 6 with an increased locking force. Therefore, the trigger force is increased proportionally and with it the power of the trigger 7 increases proportionally. Yet, the power of the trigger is advantageously provided by the reserve 5 whose power is also increased proportionally to the launch power.

According to a characteristic, the trigger 7 comprises an actuator 8, a pipe 9 connecting the reserve 5 to the actuator 8 and at least one dispenser 10 arranged on the pipe 9. Thus, as illustrated in FIG. 3, with the launcher ready to launch, the dispenser 10 is closed. A first portion of the pipe 9, connecting the reserve 5 to the dispenser 10, is connected to the loaded reserve 5, and is pressurized, as represented by a shading. On the contrary, a second portion of the pipe 9, connecting the dispenser 10 to the actuator 8, is at atmospheric pressure, as represented by a white color.

As this is a launcher 1 that can be used on an aircraft, a high degree of operational safety is desirable. Therefore, said at least one dispenser 10 can advantageously be redundant by being duplicated or more, so as to comprise at least two dispensers 10 arranged in series. This prevents a failure of one dispenser 10 of the undesired opening type. In this case, a substantially simultaneous control is applied to all dispensers 10 during a launch triggering.

According to another characteristic, a dispenser 10 comprises, as symbolically illustrated, an inlet, connected to the reserve 5, and an outlet, connected to the actuator 8. The spool of the dispenser 10 may occupy two configurations: on the one hand, a closed configuration, as illustrated in FIG. 3, where the inlet and the outlet are closed and, on the other hand, an open configuration, as illustrated in FIG. 4, where the inlet and the outlet are connected to each other. In the open configuration, the first portion of the pipe 9, connecting the reserve 5 to the dispenser 10, is still under pressure. Said pressure is then transmitted to the second portion of the pipe 9, connecting the dispenser 10 to the actuator 8, as represented by the shading. Said pressure is then transmitted to the actuator 8.

The dispenser 10 is advantageously single acting. Thus, the dispenser 10 is returned to closed configuration by a spring and controlled in open configuration by a control, preferably electrical. Said control is a triggering control which initiates a launch. The electrical control is advantageously coupled with a manual control, by direct operation of the spool. Such a manual control is advantageously used for testing or for triggering in degraded mode.

Contrary to electrical technology, where the whole dispenser is arranged in the vicinity of the plug 6 to carry out a triggering, pneumatic technology allows the dispenser 10 to be moved to the vicinity of the reserve 5. It is thus possible to move a large part of the volume of the trigger 7 as an extension of the tube 2 beyond the bolt 3. Such a substantial reduction in the volume of the launcher 1 outside the volume of the tube 2 and its extension is particularly advantageous for integrating parallel launchers 1 in a battery.

Alternatively, integration into the tube 2 is also possible.

According to another characteristic, the actuator 8 is advantageously single acting. The actuator 8 is returned to a retracted configuration by a spring and controlled to a deployed configuration, suitable for triggering, by a pneumatic control, here from the pipe 9. The pneumatic control can, here again, be coupled with a manual control. Thus, at rest, in the absence of pressure in the second portion of the pipe 9, see FIG. 3, the spring returns the piston and the rod 11, which thus remains distant from the plug 6 and its detent.

On the contrary, when a launch is desired, see FIG. 4, a pressure is present at the inlet of the actuator 8. The pressure, opposing the return force of the spring, pushes on the piston which deploys the rod 11. The deployed rod 11 actuates the detent of the plug 6. The plug 6 is then unlocked.

According to another characteristic, in order to be able to actuate the detent of the plug 6, the actuator 8 is arranged in the vicinity of the plug 6. Advantageously, compared to electrical technology, the overall size of the actuator 8 in a radial direction around the tube 2 can be very small. The actuator 8 is mainly dimensioned by the stroke of the piston and the rod. The stroke of the rod, which is determined by the stroke of the toggle device, can be limited. In this case, the support force of the actuator 8 can be increased by increasing the surface area of the piston, that is, by increasing the volume longitudinally and not radially.

According to another characteristic, the rod 11 of the actuator 8 is dimensioned to, including in the deployed configuration, in which its end is closest to the axis of the tube 2, remain outside the inner volume of the tube 2. Thus, the deployed rod 11 has an extremely low risk of interfering with the ejection of the plug 6 or the projectile P. This is made possible by a radial extension of the detent.

As illustrated in FIG. 4, the trigger is controlled. The dispenser 10 passes to the open configuration, leading to a transmission of pressure to the actuator 8. The actuator 8 deploys and its rod actuates the detent of the plug 6. The plug 6 then passes to the unlocked configuration.

As illustrated in FIG. 5, the pressurized thruster 4 pushes on the projectile P. The projectile P begins to eject, expelling the plug 6. The uncontrolled dispenser 10 returns to its resting position, that is, closed.

After ejection of the projectile P, in order to reach the end of launch state, illustrated in FIG. 6, it is desirable to depressurize the second part of the pipe 9, in order to bring the actuator 8 back to the retracted configuration. For this, according to another characteristic, the trigger 7 comprises a calibrated leak of very small cross-section. The cross-section of the leak is advantageously such that it allows a return to atmospheric pressure in a few minutes. Thus, the leak is independent of the triggering. The time taken to return to atmospheric pressure is compatible with a possible reloading of the launcher 1. The leak can be at any point of the trigger 7 located downstream of a valve of the dispenser 10: pipe 9 (second portion), downstream part of the dispenser 10, actuator 8.

The calibrated leak also has the function of preventing an untimely triggering in case of a slow leak of a dispenser. Such a case may occur for example due to loss of sealing of the dispenser or due to micro-openings that may be caused by vibrations.

In one embodiment, two dispensers are installed in series. To further reduce the risk of micro-openings caused by vibrations, the two dispensers in series can be angularly offset, for example arranged at 90°.

According to another particularly advantageous characteristic, the leak is achieved by arranging a leak at the sealing of the actuator 8, at the interface between the body and the rod 11. This allows the trigger 7 to return to its resting configuration.

From the state of FIG. 6, reloading is carried out by depressurizing the thruster 4, via the valve 14, to return it to the folded configuration. A new projectile P can be placed into the tube 2, and then a new plug 6 which is locked in place. The thruster 4 is then loaded by pressurizing its reserve 5 and a state similar to that of FIG. 3 is regained.

Thus, the buoy ejection system with pneumatic trigger comprises an ejection tube, a pressurized volume, a supply valve, a single acting dispenser electrically controlled by a solenoid, a bolt equipped with a pneumatic Y circuit enabling the supply valve, the dispenser and the pressurized volume to be connected, a single acting pneumatic piston, a pneumatic pipe connecting the piston to the dispenser, a non-captive plug equipped with a ring being retractable under the action of the single acting pneumatic piston, and a plunger acting as an interface between the buoy to be ejected and the pressurized volume. The pressurized volume supplying both the triggering and the ejection allows a triggering force proportional to the pressure and therefore to the ejection power.

The invention has been illustrated and described in detail in the drawings and the preceding description. The latter is illustrative and given as an example and not as limiting the invention to the description alone. Many alternatives are possible.

LIST OF REFERENCE SIGNS

P: projectile,
1: launcher,
2: tube,
3: bolt,
4: thruster,
5: reserve,
6: plug,
7: trigger,
8: actuator,
9: pipe,
10: dispenser,
11: rod,
12: ring,
13: groove,
14: valve,
15: plunger.

The invention claimed is:

1. A launcher (1) for a projectile comprising a storage and launching tube (2) configured to receive a projectile (P), a bolt (3) sealing one end of the tube (2), a thruster (4) arranged in the tube (2) between the bolt (3) and the projectile (P), comprising a pressurized gas reserve (5) and suitable for applying an ejection force to the projectile, a plug (6) closing the other end of the tube (2), having a locked configuration in which the plug (6) engages an internal wall of the tube (2) so as to close the tube (2) and to hold the projectile (P) in the tube (2) and an unlocked configuration in which the plug (6) is free relative to the tube (2), and a trigger (7) having a retracted resting configuration and a deployed configuration, suitable for triggering, causing the plug (6) to pass from the locked configuration to the unlocked configuration, wherein the trigger (7) is pneumatic and is supplied with pressure by the pressurized gas reserve (5).

2. The launcher (1) according to claim 1, wherein the trigger (7) comprises an actuator (8), a pipe (9) connecting the pressurized gas reserve (5) to the actuator (8) and at least one dispenser (10) arranged on the pipe (9).

3. The launcher (1) according to claim 2, wherein said at least one dispenser (10) comprises at least two dispensers (10) arranged in series.

4. The launcher (1) according to claim 2, wherein the at least one dispenser (10) comprises an inlet, an outlet, a closed configuration where the inlet and the outlet are closed and an open configuration where the inlet and the outlet are connected to each other, is single acting: returned to the closed configuration by a spring and controlled in the open configuration by a control, which may be coupled with a manual control.

5. The launcher (1) according to claim 2, wherein said at least one dispenser (10) is arranged proximate to the pressurized gas reserve (5), as an extension of the tube (2) beyond the bolt (3).

6. The launcher (1) according to claim 2, wherein the actuator (8) is single acting, returned to a retracted configuration by a spring and controlled in a deployed configuration, suitable for triggering, by a pneumatic control, which is couplable with a manual control.

7. The launcher (1) according to claim 2, wherein the actuator (8) is arranged proximate to the plug (6).

8. The launcher (1) according to claim 2, wherein the actuator (8) comprises a rod (11), dimensioned to, including in the deployed configuration, remain outside the inner volume of the tube (2).

9. The launcher (1) according to claim 2, wherein the trigger (7) comprises a calibrated leak, in order to allow a return of the trigger (7) to the resting configuration and to reduce risk of untimely triggering in case of a dispenser leak.

10. The launcher (1) according to claim 9, wherein the calibrated leak is provided in sealing of the actuator (8).

* * * * *